United States Patent [19]

Schroeder

[11] Patent Number: 5,322,313
[45] Date of Patent: Jun. 21, 1994

[54] MULTIPLE CONNECTOR TRAILER HITCH

[76] Inventor: Robert D. Schroeder, Rte. 1, Box 128, Lake Crystal, Minn. 56055

[21] Appl. No.: 54,624

[22] Filed: Apr. 29, 1993

[51] Int. Cl.[5] .............................................. B60D 1/06
[52] U.S. Cl. ................................. 280/416.1; 280/511
[58] Field of Search ................. 280/416.1, 415.1, 504, 280/511

[56] References Cited

U.S. PATENT DOCUMENTS

| | | | |
|---|---|---|---|
| 2,911,233 | 11/1959 | Riddle | 280/416.1 |
| 4,456,279 | 6/1984 | Dirck | 280/416.1 |
| 5,044,652 | 9/1991 | Brisson | 280/416.1 |
| 5,106,114 | 4/1992 | Haupt | 280/416.1 |
| 5,158,316 | 10/1992 | Hutchmacher | 280/415.1 |

*Primary Examiner*—Mitchell J. Hill
*Attorney, Agent, or Firm*—Donald A. Jacobson

[57] ABSTRACT

This trailer hitch uses a disk with ball connectors of varying sizes and an attachment hole on a circle near the circumference of the disk. Opposed horizontal upper and lower bars pivotally support a vertical shaft through the disk center. A number of locking holes on a circle near the center of the disk are sized to receive a locking rod. A locking hole is located exactly oppose each ball connector and attachment hole. A locking rod extends slideably downward through a hole in the upper bar and opposite the locking hole circle. The locking rod is spring loaded to extend the rod through an aligned locking hole in the disk, and secure the opposite ball or attachment hole in a rearward position for attachment to a trailer. Pulling upward on the handle frees the disk to permit rotating the disk to select a different size trailer connector.

6 Claims, 3 Drawing Sheets

MULTIPLE CONNECTOR TRAILER HITCH

BACKGROUND OF THE INVENTION

1. Field of the Invention

The field of the invention relates to trailer hitch apparatus, and more particularly pertains to a new and improved trailer hitch which permits placing either one of a number of sizes of ball trailer hitches or an attachment hole rearward for connection to a trailer, and then locking the hitch in place automatically with no human intervention or tools being required in the process. Attaching the trailer connector before locking it rearward provides considerable additional adjustment freedom in attaching the trailer to the hitch.

2. Description of the Prior Art

A sizeable number of contractors, municipalities and the like utilize a large number of trailers with great weight variation, which may require a number of different sized ball connectors, or perhaps even an attachment hole to receive a pin to secure a trailer to the towing vehicle. As a consequence, there is a need for a single hitch which will readily provide a selection means to permit towing a number of different trailers with different hitch requirements and to connect trailers with great weight easily.

Apparatus has been devised to provide a number of connectors for different hitchers. A number require some tool to permit selecting a different hitch means. Since a required tool may not readily available, a desirable feature would be a hitch which would permit selecting a different size hitch means with no tool being required. Dirck, U.S. Pat. No. 4,456,279 does not require a tool to provide at least two connection members but does not lock automatically, which requires attaching the connection member after the parts are completely locked in place.

SUMMARY OF THE INVENTION

This invention provides a means for selecting a number of different connector means to connect a trailer to a vehicle. The connector means comprises either different sizes of ball connectors, which mate with different sizes of ball receptacles, or a attachment hole sized to receive a pin.

A heavy steel disk, mounted horizontally and pivotably about its center, provides the selection means for the mechanism. Upper and lower opposed horizontal bars extending from a supporting structure bracket the disk. A vertical shaft supported by the ends of these bars extends through a central hole in the disk to pivoting support the disk. This use of a bracketed support for the shaft greatly increases the strength of the disk support.

The disk is positioned adjacent to the lower bar and has a cylindrical shaped sleeve placed over the shaft which extends through a central hole in the disk sized to accommodate the sleeve. The sleeve extends from the upper to the lower bar. A cylindrical shaped flange covers the portion of the sleeve extending between the disk and the upper bar. The bottom end of the flange is welded to the upper disk surface to provide additional strength for the support between the shaft and the disk.

A number of different sized connector balls, of the type used with conventional ball and receptacle trailer hitches, plus an attachment hole, sized to accept a connector pin for a conventional drawbar attachment, are spaced equally on a circle around the center of the disk near the outer edge. The connector balls are attached to the disk such as to extend outward from one side of the disk perpendicular to its surface, and the attachment hole extends through the disk perpendicular to the disk surfaces. The balls can either be welded to the disk or attached to the disk by a bolt through their centers. The connector balls extend toward the upper bar.

A number of locking holes, which extend through the disk perpendicular to the disk surfaces and sized to accept a locking rod, are spaced equally on a circle radius around the center of the disk near the sleeve and within the connectors. Each locking hole is placed exactly opposite either a connector ball or the attachment hole across the disk center on the opposite side of the disk.

A hole in the upper bar, perpendicular to the disk and sized to slideably accept a locking rod, is located exactly opposite the locking hole circle. A cylindrical shaped guide, with a central opening sized the same size as the hole in the upper bar, is welded around hole such as to extend upward from the upper surface of the bar. A locking rod, with a handle welded perpendicularly across one end, is inserted downward into the guide and the hole in the upper bar. The locking rod is made long enough that when the handle is next to the upper bar, the rod will just extend completely through an aligned locking hole in the locking hole circle.

A coil spring around the lower end of the rod is held against the upper bar by a pin through the rod to urge the rod downward. To select either one of the various balls or the attachment hole, the handle is pulled upward to lift the rod from a locking hole and free the disk. The disk is then rotated until the desired attachment means extends rearward opposite the bars. With the desired connector means extending rearward its opposed locking hole is aligned with the rod, which can then released to lock the disk in place.

A unique advantage in using a spring loaded locking rod is that the trailer can be attached to the trailer hitch before the disk is locked in place by the locking rod. This provides additional freedom to position the attachment means relative to the trailer. If the trailer is heavy it can be quite difficult to position the ball receptacle or the drawbar opening exactly over the attachment means. If the disk is rotated and the trailer connected without the locking rod being inserted into the disk, then as the towing vehicle moves forward the attachment means will be moved to the rear as tension in placed on the hitch. When the attachment means is exactly opposite the bars then the opposed locking hole will be opposite the rod, which will permit the spring to automatically urge the rod into the opposed locking hole with no intervention being required. This additional degree of freedom can be very helpful if the towed vehicle is quite heavy such that positioning the two mating parts of the trailer hitch exactly opposite one other would be quite difficult without this additional degree of freedom.

DETAILED DESCRIPTION OF THE INVENTION

Figure 1:
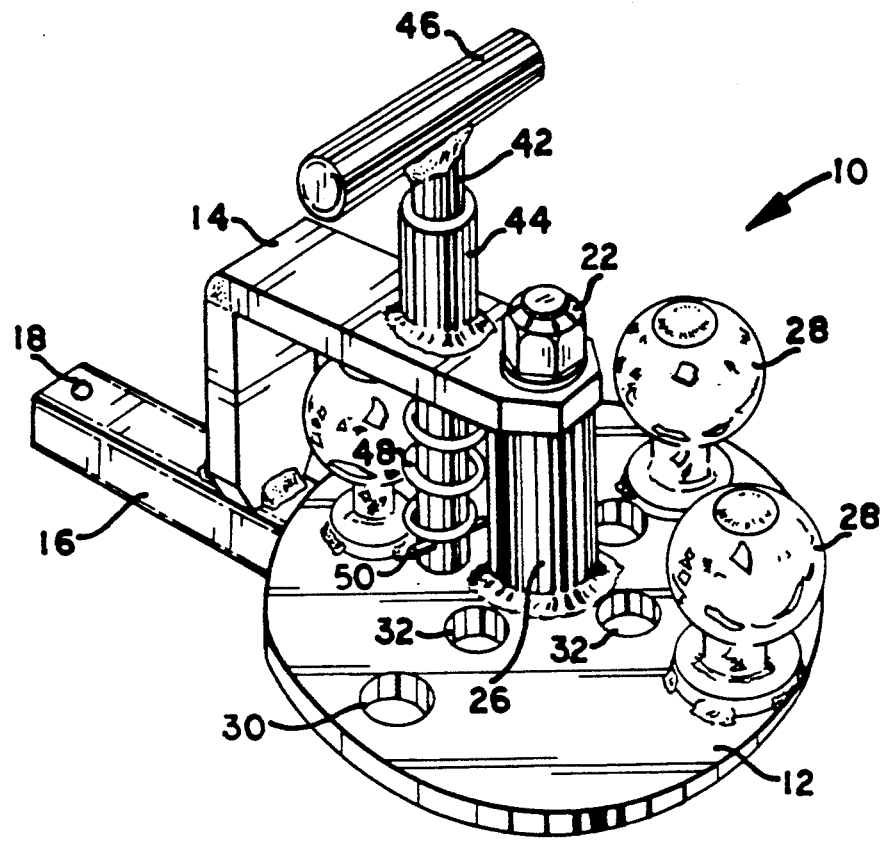
FIG. 1 is an isometric view of the hitch.

An overview of trailer hitch 10 is shown in FIG. 1. This consists of a heavy steel disk 12, a steel supporting structure 14 for the disk which includes attachment beam 16, which has a square cross-section and is sized to fit within a mating receptacle which extends rearward from a towing vehicle. Beam 16 is secured by means of a bolt through holes 18 which extend through both sides of beam 16 and through aligned holes in a mating receptacle in the towing vehicle.

Figure 5:
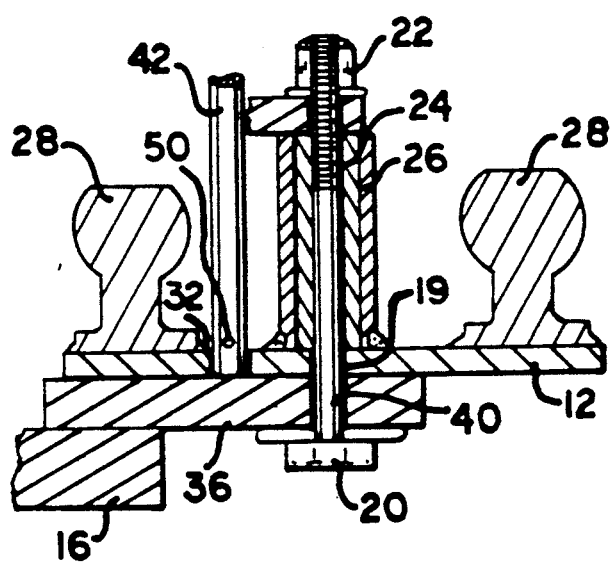
FIG. 5 is a cross-section of FIG. 4 taken along 5—5.

As also shown in FIG. 5, disk 12 has a central hole 19 sized to accept bolt 20 which extends through upper and lower washers and is secured is place by a nut 22. Bolt 20 provides shaft means for the rotation of disk 12. A sleeve 24, which fits closely around bolt 20, acts as a bearing to increase the area of contact to reduce the rotation friction and also increase the pivot strength. Sleeve 24 is closely covered by guide 26 which is welded to the upper surface of disk 12. Guide 26 also provides additional strength for the pivot strength of disk 12.

Figure 2:
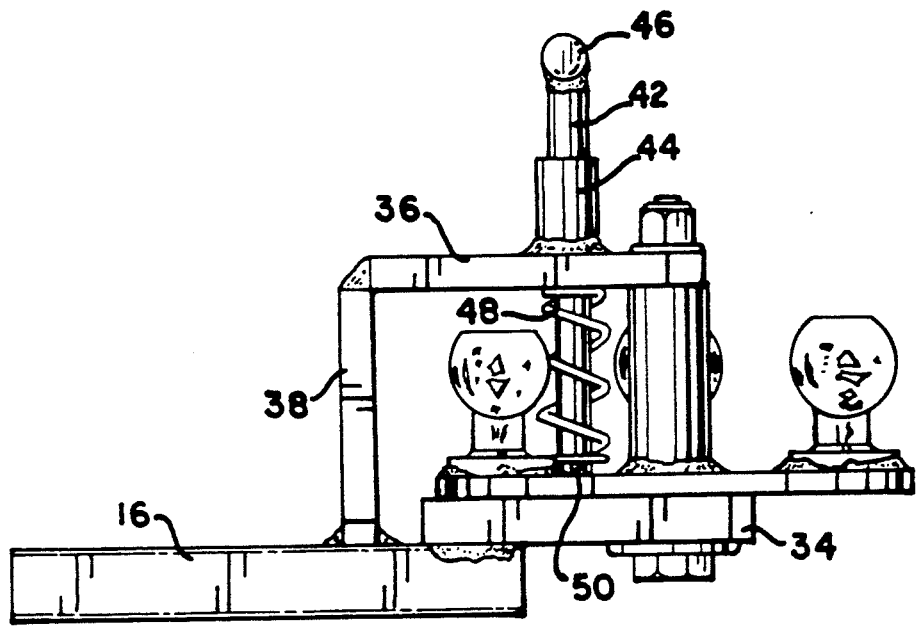
FIG. 2 is a side view of the hitch.

As shown in FIGS. 1 and 2, disk 12 has a number of trailer hitch attachment balls 28 of various sizes welded to its upper surface, and has one attachment hole 30 which is sized to accept an attachment pin, all being spaced equally around the disk near the outer edge. If desired, balls 28 can be attached to disk 12 by means of a bolt through the ball extending through a mating hole in the disk and secured by a mating bolt and nut.

A set of locking holes 32, sized to accept a rod, are equally spaced around the center of disk 12 on a circle, with each locking hole being opposite a ball 28 or the attachment hole 30, and aligned therewith across the disk center.

Lower support bar 34 and vertical support bar 38 are welded directly to attachment beam 16, while upper support bar 36 is welded to the top of vertical support bar. These parts make up support structure 14 and provide a great deal of strength by supporting bolt 22 on both ends. As also shown in FIG. 5, lower support bar 34 has a hole 40 sized to accept bolt 20.

Rod 42 extends downward through a cylindrical shaped guide 44. Guide 44 is welded to upper support bar 36, which has a hole the same size as the hole through the guide and aligned therewith, both being sized to slideably receive locking rod 42. A handle 46 is welded across the upper end of locking rod 42. A coil spring 48, secured on the lower end by pin 50 extending through a mating hole perpendicular to locking rod 42, acts against the pin to urge the rod downward.

Rod 42 is positioned exactly opposite the circle containing locking holes 32. If any one of the locking holes 32 is exactly opposite locking rod 42, then the rod will be forced downward through the hole by spring 48 to secure disk 12 in that attitude, otherwise the disk can be rotated until one of the locking holes is exactly opposite the rod. Whenever one of the locking holes 32 is secured by rod 42 then either one of the attachment balls 28 or the attachment hole 30 will be exactly opposite lower and upper support bars 34 and 36, to provide the available attachment means for attaching a trailer to the vehicle.

The additional feature provided by spring loaded locking rod 42 is shown in FIGS. 3, 3A, 4, 4A and 5. These figures illustrate how after the trailer is attached with disk 12 unlocked, the forward motion of the towing vehicle will cause disk 12 to rotate and lock with the selected attachment means rearward. In these figures parts above disk 12 are omitted, including a portion of upper support bar 36, to permit seeing this process more clearly.

Figure 3:
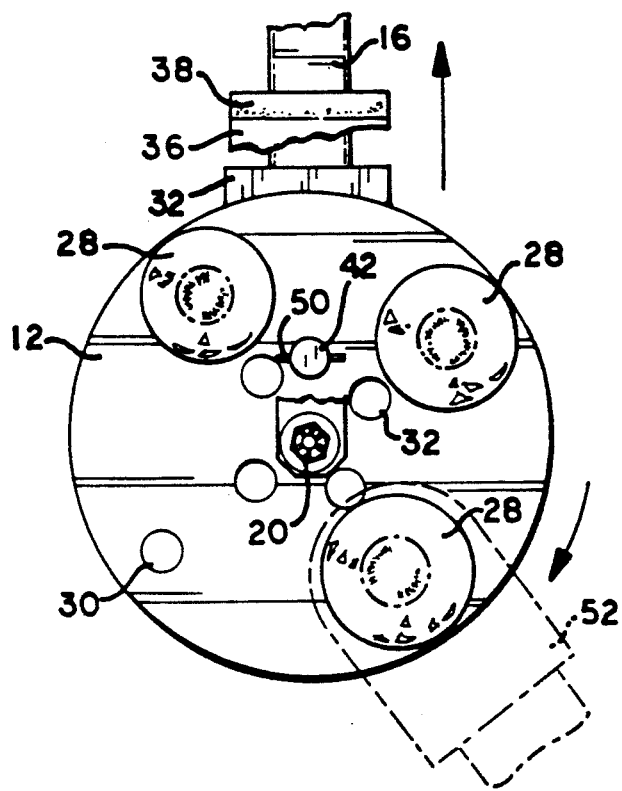
FIG. 3 is a top view of the disk with the portions above the disk removed and with the disk unlocked.
Figure 3A:
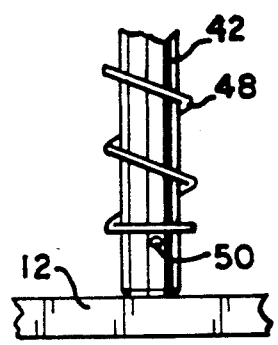
FIG. 3A is a detail of the rod bearing against the disk in FIG. 3 preventing the disk from locking.

As shown in FIGS. 3 and 3A, ball receptacle 52, shown in phantom outline, has engaged a lower ball 28. This is the only part of the attachment process requiring direct human intervention, since an operator must position the trailer to make this connection. Here ball 28 is not exactly rearward of attachment beam 16, which would be on a line extending through beam 16 to the towing vehicle, and therefore locking rod 42 is not aligned with any of the locking holes 32, resulting in the locking rod being forced against the upper surface of disk 12. With this arrangement disk 12 is free to rotate as the towing vehicle moves forward in the direction indicated by the arrow adjacent to FIG. 3.

Figure 4:
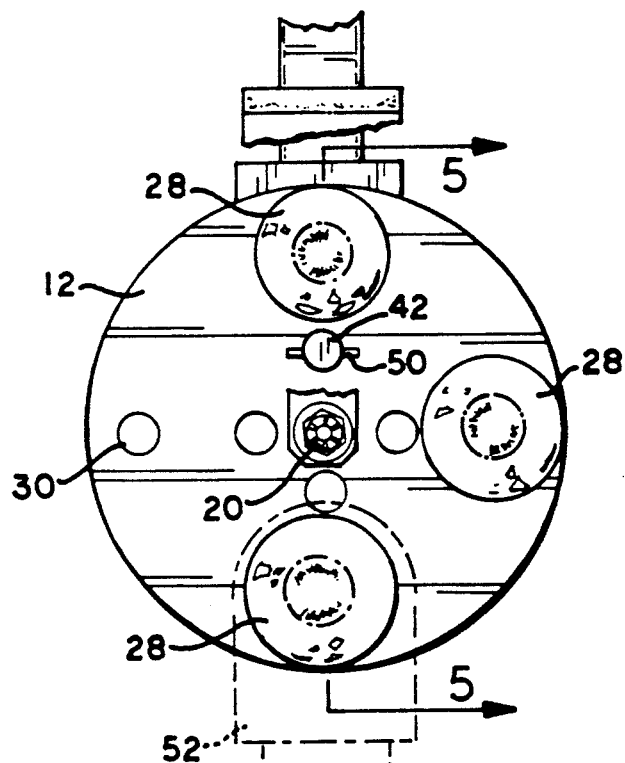
FIG. 4 is the view of FIG. 3 with the connecting means exactly rearward and with the disk locked.
Figure 4A:
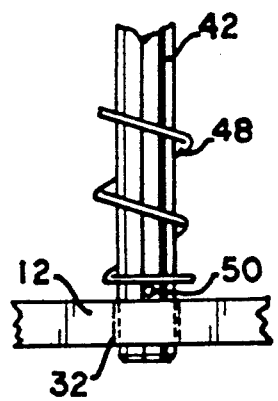
FIG. 4A is a detail of the rod inserted through the disk in FIG. 4 locking the disk.

FIGS. 4 and 4A, show the results of the motion of the towing vehicle in the direction shown by the arrow of FIG. 3. This movement of the towing vehicle pulling against attachment beam 16 will cause the disk to rotate because ball receptacle 52 being attached to the trailer will tend to pull the attached ball receptacle 52 rearward. When disk 12 has been rotated to the position a shown in FIG. 4, locking rod 42 will be exactly opposite the attachment hole 30 which is aligned with the attached ball 28 across the center of disk 12. As shown in FIG. 4A, locking rod 42 is then forced through locking hole 32.

This sequence illustrates how an attachment can be made to one of the attachment means, either one of the balls 28 or the attachment hole 30, before disk 12 is locked into position by locking rod 42. This additional degree of freedom is particularly important when the towed vehicle is heavy and difficult to move in that it provides an additional degree of freedom in positioning the attachment means relative to the trailer when attaching the trailer to the vehicle. As discussed earlier, this flexibility in the placement of the trailer with respect to the towing vehicle while attaching the trailer, can be critical if the trailer is heavy and difficult to move.

While this invention has been described with reference to an illustrative embodiment, this description is not intended to be construed in a limiting sense. As examples of variations, disk 12 does not have to be circular, basically any shape that can pivot between support bars 34 and 36 and support balls 28 is a candidate. Attachment hole 30 is optional and can be replaced by another ball 28. Essentially, structure 14 can be any form which will hold bars 34 and 36 in the orientation shown outward directed outward from the towing vehicle. It is contemplated that the parts of this hitch are made of steel, but any material having the proper strength requirements could be used.

Various other modifications of the illustrative embodiment, as well as other embodiments of the invention, will be apparent to persons skilled in the art upon reference to this description. It is therefore contemplated that the appended claims will cover any such modifications or embodiments as fall within the true scope of the invention.

What is claimed is:

1. A multiple connector trailer hitch comprising:
   a) supporting structure means for attaching the trailer hitch to the rear of a towing vehicle, said supporting structure comprising:
      i) a beam having a first and a second end, the first end being attached to said towing vehicle with the beam generally horizontally oriented;
      ii) a first bar which is no longer than said beam having a first and a second end, with said first bar being positioned directly above said beam a predetermined distance therefrom and generally parallel thereto, with the second end of said first bar being located directly above the second end of said beam, and
      iii) a second bar attached vertically to and between said beam and said first bar and preferably to the first end of said first bar; and
   b) a disk having opposed first and second planar surfaces, said disk having pivot means for pivoting said disk around its center; said pivot means being located between the second ends of said beam and said first bar with the disk oriented such that the first planar surface thereof is uppermost and generally horizontal, said disk having a plurality of trailer attachment means for attaching mating trailer connectors, said trailer attachment means being attached circumferentially to the first planar surface of said disk such as to extend outwardly perpendicular therefrom, with the disk dimensions, the predetermined distance between the beam and the first bar, the distance of the first surface of said disk from said first bar, and the location of the second bar being such that said disk and said trailer attachment means can rotate freely between said beam and said first bar, and
   d) disk locking means for locking the disk relative to the supporting structure arranged such that a preselected one of the plurality of trailer attachment means can be locked in a rearward position from the towing vehicle and in alignment with said beam.

2. Apparatus as in claim 1 wherein said locking means comprises:
   a) a plurality of locking holes equal in number to the number of trailer attachment means, said locking holes extending perpendicularly through said disk between the first and second planar surfaces thereof, being located on a first circle of a predetermined size having a center coincident with said disk pivot means, the locking holes being positioned such that a locking hole is positioned on the opposite side of the first circle from each trailer attachment means; and
   b) a locking rod having slidable attachment means, positioned opposite said beam and that portion of the first circle of said locking holes which is nearest to the first end of said beam, for slideably attaching said locking rod to said first bar such that said locking rod extends downward perpendicularly therefrom, having a range of motion from an upper to a lower position, said locking rod having spring means for urging said locking rod downward, and having a length such that in the lower position said locking rod will extend into an opposed locking hole in said disk, and in the upper position will clear said disk.

3. Apparatus as in claim 2 wherein said slidable attachment means comprises a vertical hole through said first bar sized to slideably accept said locking rod which is located opposite the circle in said disk containing said locking holes, with said locking rod extending downward through said vertical hole, with said locking rod also having handle means attached above said first bar for retracting said locking rod, and with said first bar having a cylindrical shaped guide with an axial hole sized to slideably fit said locking rod with said guide attached to the upper surface of said first bar around said vertical hole.

4. Apparatus as in claim 2 wherein said spring means comprises a coil spring positioned around said locking rod between said disk and said first bar, having a pin mounted through said locking rod adjacent to the lower end of said coil spring between said coil spring and said disk such that said spring will bear against the first bar and urge the rod downward.

5. Apparatus as in claim 2 wherein said trailer attachment means comprises hitch balls of various sizes attached to and extending upwardly from the first surface of said disk.

6. Apparatus as in claim 5 wherein at least one of said trailer attachment means is an attachment hole through the disk perpendicular to the planar surfaces sized to accept an attachment pin.

* * * * *